(12) United States Patent
Park et al.

(10) Patent No.: US 10,260,628 B2
(45) Date of Patent: Apr. 16, 2019

(54) METHOD OF CONTROLLING PULLEY RATIO OF CONTINUOUSLY VARIABLE TRANSMISSION VEHICLE

(71) Applicants: Hyundai Motor Company, Seoul (KR); Kia Motors Corporation, Seoul (KR)

(72) Inventors: Jun Sung Park, Yongin-si (KR); Ho Young Kim, Suwon-si (KR); Chan Hee Won, Seoul (KR); Kyung Eup Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,466

(22) Filed: Nov. 29, 2017

(65) Prior Publication Data

US 2019/0063601 A1 Feb. 28, 2019

(30) Foreign Application Priority Data

Aug. 30, 2017 (KR) ........................ 10-2017-0109889

(51) Int. Cl.
*F16H 61/662* (2006.01)
*F16H 59/02* (2006.01)
(Continued)

(52) U.S. Cl.
CPC ....... *F16H 61/662* (2013.01); *F16H 59/0204* (2013.01); *F16H 2059/663* (2013.01);
(Continued)

(58) Field of Classification Search
CPC ........... F16H 59/0204; F16H 2059/663; F16H 2061/6616; F16H 61/662
See application file for complete search history.

(56) References Cited

U.S. PATENT DOCUMENTS 5,947,861 A * 9/1999 Nobumoto ........ F16H 61/66254
477/37
2009/0171542 A1* 7/2009 Sugiura ............... F16H 61/0213
701/52

(Continued)

FOREIGN PATENT DOCUMENTS

JP H09-303538 A 11/1997
JP 3637712 B2 4/2005
(Continued)

*Primary Examiner* — Edwin A Young
(74) *Attorney, Agent, or Firm* — Morgan, Lewis & Bockius LLP

(57) ABSTRACT

A method of controlling a pulley ratio of a continuously variable transmission vehicle, includes: sensing, by a controller, whether or not the position of a shift lever switches to a manual range, fixing, by the controller, a pulley ratio of a continuously variable transmission, when the position of the shift lever switches to the manual range, as a result of sensing, re-adjusting, by the controller, set pulley ratios of a plurality of manual shift positions based on the fixed pulley ratio of the continuously variable transmission, after the fixation, and controlling, by the controller, the continuously variable transmission at the re-adjusted pulley ratio of a target manual shift position, when manual shifting is required, after re-adjustment.

5 Claims, 4 Drawing Sheets

(51) Int. Cl.
*F16H 59/66* (2006.01)
*F16H 61/66* (2006.01)

(52) U.S. Cl.
CPC ............... *F16H 2061/6616* (2013.01); *F16H 2061/66209* (2013.01)

(56) References Cited

U.S. PATENT DOCUMENTS

2012/0143451 A1\* 6/2012 Nishida ............... F16H 61/0213
701/52
2015/0198240 A1\* 7/2015 Ajimoto .................. F16H 61/21
701/55

FOREIGN PATENT DOCUMENTS

| | | |
|---|---|---|
| JP | 2005-315320 A | 11/2005 |
| JP | 3716704 B2 | 11/2005 |
| KR | 10-0747037 B1 | 8/2007 |
| KR | 10-2015-0086453 A | 7/2015 |

\* cited by examiner

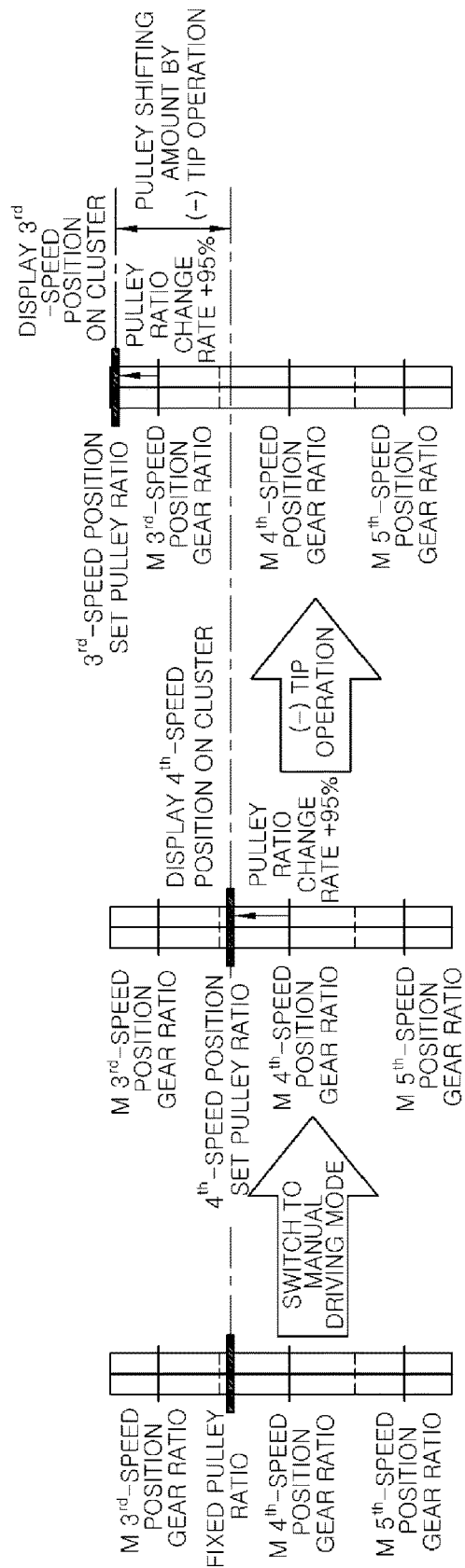

METHOD OF CONTROLLING PULLEY RATIO OF CONTINUOUSLY VARIABLE TRANSMISSION VEHICLE

CROSS-REFERENCE TO RELATED APPLICATION

The present application claims priority to Korean Patent Application No. 10-2017-0109889, filed on Aug. 30, 2017, the entire contents of which is incorporated herein for all purposes by this reference.

BACKGROUND OF THE INVENTION

Field of the Invention

The present invention relates to a method of controlling a pulley ratio of a continuously variable transmission vehicle, and more particularly to a method of controlling a pulley ratio of a continuously variable transmission vehicle which prevents a driver from feeling a sense of incompatibility due to shifting while maintaining uniform shift feeling, in manual shifting.

Description of Related Art

Fuel efficiency improvement and eco-friendly pursuit have become core targets in vehicle development and, to achieve such targets, application of a continuously variable transmission (CVT) is being increased.

A CVT means a transmission which may acquire continuous gear ratios using a belt or a planetary gear set in place of conventional gears. In general, a stepped-speed transmission offers a fixed number of gear ratios and a gear ratio is adjusted as needed. On the other hand, the CVT may continuously change a gear ratio within a constant range.

In such a CVT, shifting is conducted only by manipulating an accelerator pedal and, thus, ride comfort is excellent and a fuel consumption rate and acceleration ability are improved.

Of course, the CVT may flexibly control a gear ratio within a fixed range and thus have excellent fuel efficiency and power performance. However, the CVT lowers response to engine RPM and may thus be evaluated as causing driver's stuffiness and boredom.

Therefore, research on a method of variously controlling a pulley ratio of a CVT in a vehicle employing the CVT to promote passenger's fun and improve drivability is underway now.

The above description has been provided to aid in understanding of the background of the present invention and may not be interpreted as conventional technology known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling a pulley ratio of a continuously variable transmission vehicle which employs a manual driving mode to improve drivability of the vehicle, prevents sudden change of a pulley ratio when the manual driving mode is executed or irregular change of a pulley ratio during tip operation and thus minimizes incompatibility due to shifting.

In accordance with various aspects of the present invention, the above and other objects can be accomplished by the provision of a method of controlling a pulley ratio of a continuously variable transmission vehicle, including sensing, by a controller, whether or not the position of a shift lever switches to a manual range, fixing, by the controller, a pulley ratio of a continuously variable transmission, when the position of the shift lever switches to the manual range, as a result of sensing, re-adjusting, by the controller, set pulley ratios of a plurality of manual shift positions based on the fixed pulley ratio of the continuously variable transmission, after the fixation, and controlling, by the controller, the continuously variable transmission at the re-adjusted pulley ratio of a target manual shift position, when manual shifting is required, after the re-adjustment.

The re-adjustment may include confirming, by the controller, a manual shift position having a set pulley ratio being closest to the fixed pulley ratio, out of the manual shift positions and determining a difference value by subtracting the fixed pulley ratio from the set pulley ratio of the current manual shift position corresponding to the confirmed manual shift position, and adding, by the controller, the determined difference value to the set pulley ratios of the respective manual shift positions, after the determination.

The method may further include comparing, by the controller, the gradient of a road by a predetermined angle, after the re-adjustment of the set pulley ratios, and downshifting, by the controller, from the current manual shift position by one position, when the gradient of the road is the predetermined angle or less, as a result of comparison, and, after the downshift, the controller may execute control of the continuously variable transmission at the re-adjusted pulley ratio of the target manual shift position.

The method may further include, immediately before execution of the control, displaying, by the controller, a manual shift position corresponding to the pulley ratio of the continuously variable transmission on a cluster.

The respectively manual shift positions may be determined such that there is a difference of a constant interval between the set pulley ratios of neighboring manual shift positions.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 and FIG. 4 are views illustrating a pulley ratio change rate application method in accordance with one exemplary embodiment of the present invention in brief.

Figure 1:
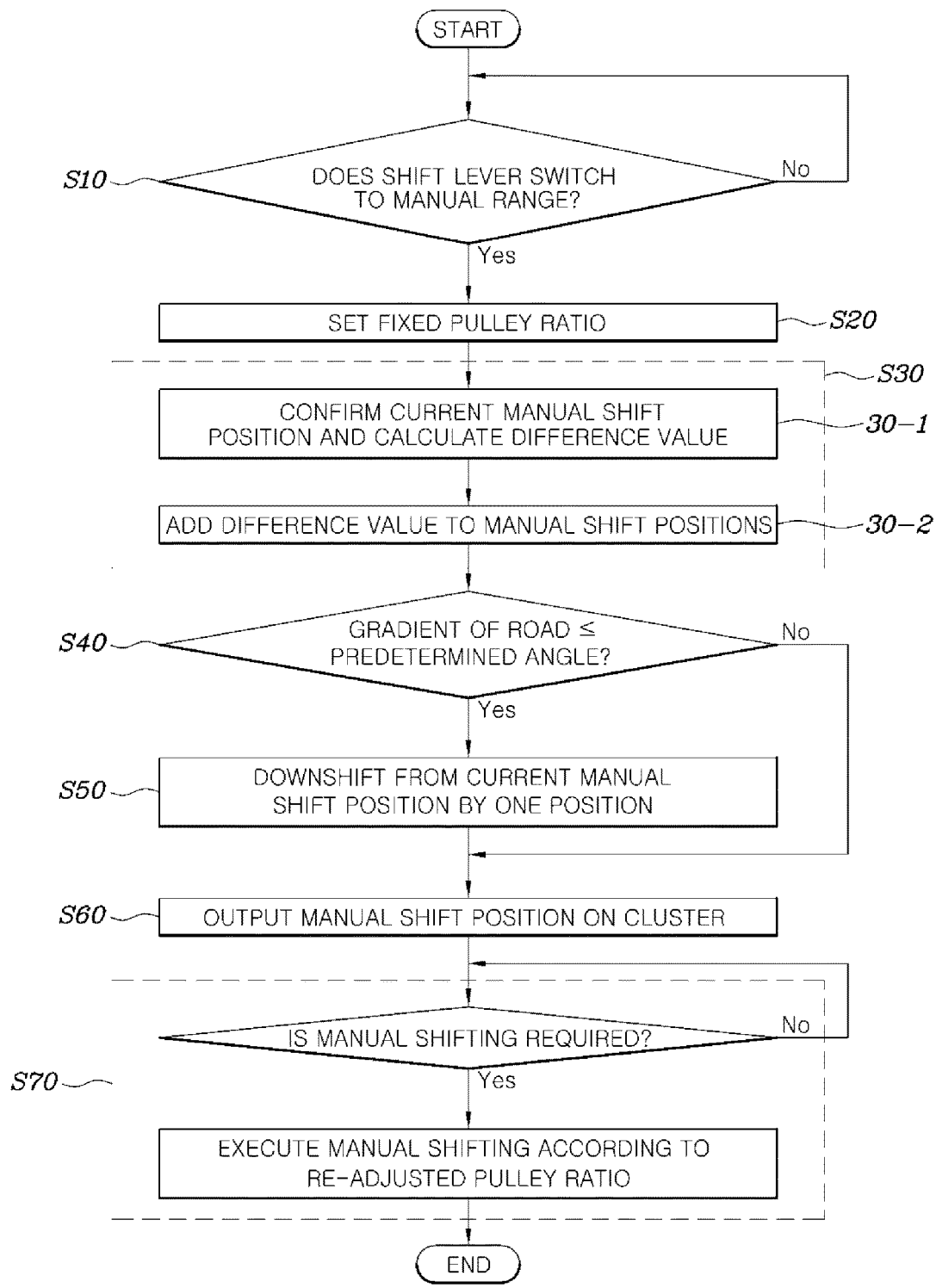
FIG. 1 is a flowchart illustrating a method of controlling a pulley ratio of a continuously variable transmission vehicle in accordance with one exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made more specifically to the exemplary embodiments of the present invention, exemplary embodiments of which are illustrated in the accompanying drawings. Wherever possible, the same reference numbers will be used throughout the drawings to refer to the same or like parts.

Figure 2:
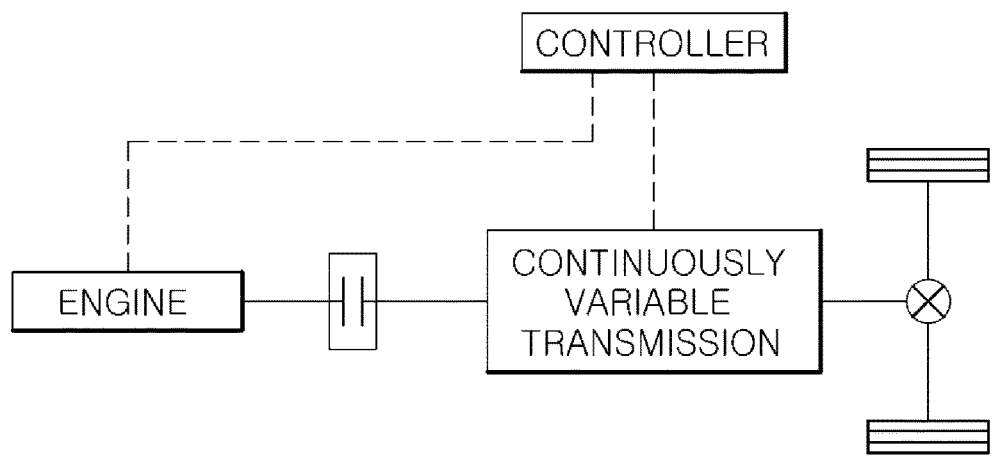
FIG. 2 is a view illustrating a continuously variable transmission vehicle in accordance with one exemplary embodiment of the present invention in brief.

FIG. 1 is a flowchart illustrating a method of controlling a pulley ratio of a continuously variable transmission vehicle in accordance with one exemplary embodiment of the present invention, and FIG. 2 is a view illustrating a continuously variable transmission vehicle in accordance with one exemplary embodiment of the present invention in brief.

With reference to FIG. 1 and FIG. 2, a method of controlling a pulley ratio of a continuously variable transmission vehicle in accordance with various aspects of the present invention may include sensing, by a controller, whether or not the position of a shift lever shifts to a manual (M) range (Operation S10), fixing, by the controller, a pulley ratio of a continuously variable transmission when the position of the shift lever shifts to the M range, as a result of detecting in Operation S10 (Operation S20), re-adjusting, by the controller, set pulley ratios of a plurality of manual shift positions based on the fixed pulley ratio after the fixation in Operation S20 (Operation S30), and controlling, by the controller, the continuously variable transmission, at the re-adjusted pulley ratio of a target manual shift position, when manual shifting is required after the re-adjustment in Operation 30 (Operation S70).

As exemplarily shown in FIG. 2, various aspects of the present invention are directed to providing a vehicle in which a continuously variable transmission is applied between an engine and a differential, and a controller may communicate with the engine and the continuously variable transmission and transmit and receive control signals to control a pulley ratio of the continuously variable transmission. Here, the controller may be provided as a single control device, or include a plurality of control devices to respectively transmit and receive control signals to or from the engine and the continuously variable transmission.

When the vehicle, to which the continuously variable transmission is applied, is driven in a general driving mode, a pulley ratio is continuously changed according to a vehicle speed and a pressing amount of an accelerator pedal and, thus, a driver has difficulty in feeling a sense of shifting or a sense of sporty driving while driving. Therefore, to satisfy driver's sense of driving, the vehicle, to which the continuously variable transmission is applied, may be configured such that manual shifting is executed.

The controller in accordance with various aspects of the present invention, when the driver of the vehicle, to which the continuously variable transmission is applied, requires a manual driving mode by shifting a shift lever to a manual (M) range, fixes a pulley ratio of the continuously variable transmission at the present time and then controls the continuously variable transmission to execute manual shifting later (Operation S20).

When the manual driving mode is executed by driver's demand, when the pulley ratio of the continuously variable transmission is changed to a pulley ratio predetermined according to a vehicle speed and an advanced planning system (APS), momentary driving incompatibility may occur and thus have a negative influence on a driver's sense of driving. Therefore, in various exemplary embodiments of the present invention, when the position of the shift lever shifts to the M range, the pulley ratio of the continuously variable transmission is fixed and manual shifting of the continuously variable transmission is controlled based on the fixed pulley ratio, thus causing a sense of shifting configured for satisfying the driver.

Furthermore, in an exemplary embodiment of the present invention, set pulley ratios of a plurality of manual shift positions are re-adjusted based on the fixed pulley ratio so that the driver may feel a sense of uniform shifting during manual shifting.

In more detail, in re-adjustment (Operation S30), the controller confirms a manual shift position having a set pulley ratio which is closest to the fixed pulley ratio, out of the manual shift positions, determines a difference value by subtracting the fixed pulley ratio from the set pulley ratio of the confirmed manual shift position, i.e., the current manual shift position (Operation S30-1), and adds the determined difference value to the set pulley ratios of the respective manual shift positions (Operation S30-2).

Figure 3:
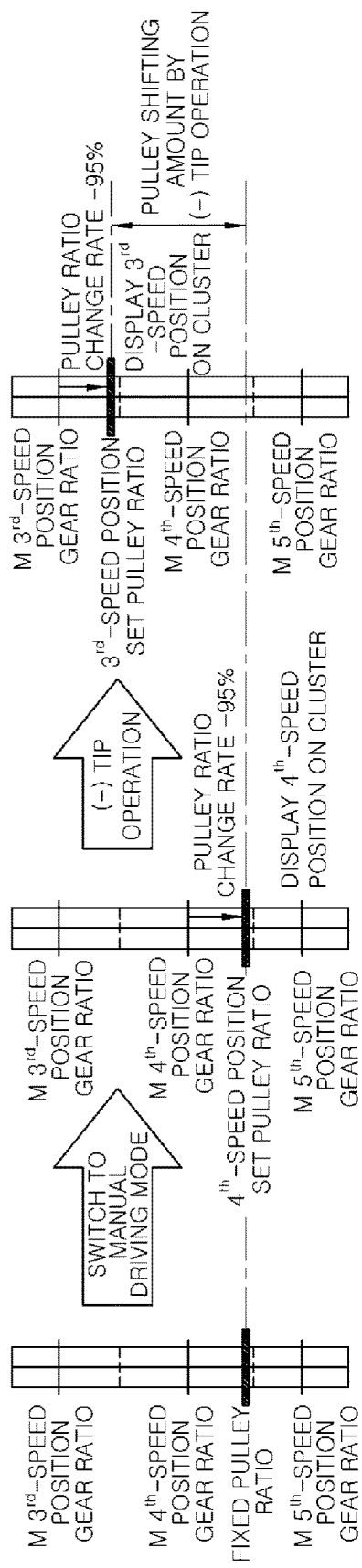

FIG. 3 and FIG. 4 are views illustrating a pulley ratio change rate application method in accordance with one exemplary embodiment of the present invention in brief.

With reference to FIG. 3, on assumption that the continuously variable transmission vehicle is driven in a general driving mode in which a pulley ratio is continuously changed and then switches to the manual driving mode by the driver, a fourth-speed position having a set pulley ratio closest to the pulley ratio at the present time, i.e., the fixed pulley ratio, is selected as a current manual shift position. Thereafter, a difference value between the fixed pulley ratio and the set pulley ratio of the manual fourth-speed position, i.e., a change rate, is determined. For example, the change rate is determined as −95% in FIG. 3. As such, the change rate of −95% is applied to the set pulley ratios of the manual shift positions except for the manual fourth-speed position and may thus provide a constant shifting degree when shifting of the vehicle is subsequently conducted.

That is, with reference to FIG. 3, when a driver requires downshift, the continuously variable transmission may be controlled at the re-adjusted pulley ratio of the manual 3-speed position.

On the other hand, with reference to FIG. 4, when the change rate of the fixed pulley ratio from the set pulley ratio of the manual 4-speed position is determined as +95%, the change rate of +95% is applied to the set pulley ratios of the manual shift positions except for the manual 4-speed position and may thus provide a constant shifting degree when shifting of the vehicle is subsequently conducted.

Therefore, by re-adjustment (Operation S30), when the driver executes upshift or downshift by operating the shift lever or a paddle shift, a pulley ratio variation amount by tip operation becomes constant and causes a sense of uniform shifting and, thus, a sense of driving may be enhanced.

Furthermore, the method in accordance with various aspects of the present invention may further include comparing, by the controller, the gradient of a road by a predetermined angle after the re-adjustment in Operation S30 (Operation S40), and downshifting, by the controller, from the current manual shift position by one position when the gradient of the road is the predetermined angle or less, as a result of comparison in Operation S40 (Operation S50). Thereafter, the controller may execute control (Operation S70) after the downshift (Operation S50).

Here, the predetermined angle may be an angle which is configured as a criterion to judge whether or not the vehicle is driven on a downhill road. That is, when the driver executes the manual driving mode, the controller confirms whether or not the vehicle is driven on a downhill road by measuring the gradient of the road.

When the vehicle is driven on the downhill road, the driver executes the manual driving mode to operate an engine brake.

Therefore, when the manual driving mode is executed on a downhill gradient, downshift by one position is automatically executed to forcibly operate the engine brake according to driver's demand and, thus, driver's driving requirements may be satisfied.

Furthermore, immediately before execution of the control (Operation S70), the controller may display a manual shift position corresponding to the pulley ratio of the continuously variable transmission on a cluster (Operation S60).

As exemplarily shown in FIG. 3 and FIG. 4, immediately after switching from the general driving mode to the manual driving mode, the manual shift position corresponding to the pulley ratio of the continuously variable transmission is displayed on the cluster.

Here, since the manual shift positions are set to have re-adjusted pulley ratios rather than the set pulley ratios, the manual shift position having the set pulley ratio corresponding to the pulley ratio of the continuously variable transmission is displayed on the cluster and may thus inform the driver of the shift position at which the driver drives the vehicle.

In an exemplary embodiment of the present invention, the set pulley ratios of the respective manual shift positions may be determined to form a constant pulley ratio difference with the set pulley ratios of the neighboring manual shift positions.

Therefore, when the driver executes shifting of the vehicle in the manual driving mode, the driver may feel a sense of uniform shifting and, thus, marketability and drivability of the vehicle may be improved.

As is apparent from the above description, in a method of controlling a pulley ratio of a continuously variable transmission vehicle having the above-described structure, when the continuously variable transmission vehicle switches to a manual driving mode, a pulley ratio of the continuously variable transmission vehicle at the present time is fixed and, thus, it is possible to prevent a driver from feeling a sense of incompatibility due to switching to the manual driving mode.

Furthermore, when upshift or downshift is executed by driver's tip operation, a constant pulley ratio change rate may be maintained and, thus, uniform shifting may be maintained and a sense of shifting may be improved.

Furthermore, when the manual driving mode of the continuously variable transmission vehicle is executed on a downhill gradient, downshift is automatically executed and, thus, driver's driving satisfaction may be improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a pulley ratio of a continuously variable transmission in a vehicle, comprising:
   detecting, by a controller, whether a position of a shift lever switches to a manual range;
   fixing, by the controller, the pulley ratio of the continuously variable transmission, when the position of the shift lever switches to the manual range, as a result of the detecting;
   re-adjusting, by the controller, set pulley ratios of a plurality of manual shift positions based on the fixed pulley ratio of the continuously variable transmission, after the fixation; and
   controlling, by the controller, the continuously variable transmission at a re-adjusted pulley ratio of a target manual shift position, when manual shifting is required, after the re-adjusting.

2. The method according to claim 1, wherein the re-adjusting includes:
   confirming, by the controller, a manual shift position having a set pulley ratio being closest to the fixed pulley ratio, out of the manual shift positions;
   determining, by the controller, a difference value by subtracting the fixed pulley ratio from the set pulley ratio of a current manual shift position corresponding to the confirmed manual shift position; and
   adding, by the controller, the determined difference value to the set pulley ratio of a respective manual shift positions, after the determining.

3. The method according to claim 2, further including:
   comparing, by the controller, a gradient of a road by a predetermined angle, after the re-adjusting of the set pulley ratios; and
   downshifting, by the controller, from the current manual shift position by one position, when the gradient of the road is the predetermined angle or less, as a result of the comparing,
   wherein, after the downshifting, the controller is configured to execute control of the continuously variable transmission at the re-adjusted pulley ratio of the target manual shift position.

4. The method according to claim 3, further including:
before the executing of the controlling, displaying, by the controller, a manual shift position corresponding to the pulley ratio of the continuously variable transmission on a cluster.

5. The method according to claim 1, wherein the respectively manual shift positions are set such that there is a difference of a constant interval between the set pulley ratios of adjacent manual shift positions.

* * * * *